Oct. 12, 1943.   G. M. BROWN   2,331,762
PACKAGING
Filed June 15, 1940
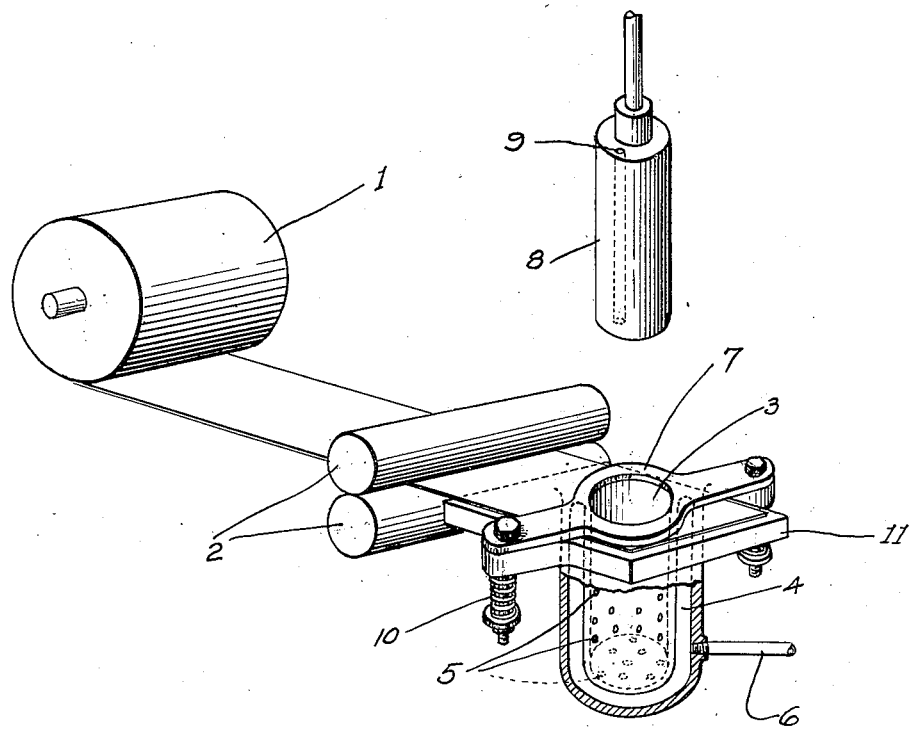
Inventor
George M. Brown
By
Attorney

UNITED STATES PATENT OFFICE 2,331,762

PACKAGING

George M. Brown, New York, N. Y., assignor to Wingfoot Corporation, Akron, Ohio, a corporation of Delaware Application June 15, 1940, Serial No. 340,728

1 Claim. (Cl. 18—56)

This invention relates to packaging with a heat-stretchable and heat-sealable film such as a sheet of rubber hydrochloride. For example, the wrapping material sold under the trade name Pliofilm by The Goodyear Tire & Rubber Company may be used in the packaging operation. The invention includes both the method of packaging and apparatus therefor.

According to the invention a sheet of the wrapping material is placed over a cavity. The sheet is heated to make it easily stretchable. It is then stretched into the cavity by a plunger. The particular improvement of the invention lies in the use of vacuum within the cavity to hold the stretched film in position after it has been forced into the cavity by the plunger. While held in position the material to be packaged is supplied to the cavity lined with the film. This material which is to be packaged may be a solid material or liquid or granular material. If a large number of articles of a definite shape are to be packaged the cavity may be of such shape as to exactly hold the article, and the plunger may be correspondingly formed to fit the cavity.

The invention will be further described in connection with the accompanying drawing in which a roll of rubber hydrochloride film 1 is used as the source of supply of the wrapping material. This is run through feed rolls 2 over the cavity 3. A portion of the cavity is broken away to show the surrounding vacuum chamber 4 and passages 5 which connect the vacuum chamber with the cavity. Vacuum is applied to the chamber through the pipe 6.

In operation film is drawn over the cavity and held in place under the annular ring 7. The coil springs 10 hold the ring 7 to the bed plate 11 and thus prevent slippage of the film under the ring. The portion of film clamped in place may then be severed from the balance of the roll by suitable mechanism (not shown). Before or after being clamped into place the film is heated to make it easily stretchable. This may be done by lowering a heated plate over the portion of the film which covers the mouth of the cavity. After the heating plate has been removed the plunger 8 is lowered into the cavity. It stretches the film as it is lowered and brings the stretched film into contact with the walls of the cavity or in close proximity therewith. Suction is then applied through the line 6 and the film is drawn or held to the wall of the cavity. The plunger is then withdrawn and the material to be packaged is placed in the cavity. The package is completed by twisting the stretched film with respect to the unstretched film clamped under the annular ring. This may be done by twisting the cavity and holding the ring and plate to which it is attached firm or by twisting the latter and holding the cavity firm. If the film has been heated sufficiently, sufficient pressure may be brought to bear at the twist to cause coalescence of overlapping layers of the film and the formation of an air-tight closure.

The strength of the suction during the twisting may be varied to regulate the tightness of the film on the finished package. For example, if the cavity is somewhat larger than the article to be wrapped and the suction is maintained during the wrapping operation the wrapper may be rather loose. If the suction is shut off during the twisting operation the wrapper may be drawn close to the article to fit it snugly. The stretched film retracts some on cooling if not held in an extended relation and this in itself tends to give a tight wrap.

If the plunger forms a snug fit with the cavity vacuum need be applied at only a few points in the suction cup to maintain a tight fit. Where the fit of the plunger is not so snug more openings between the cavity and surrounding vacuum chamber will be desirable to draw the film to all parts of the cavity. An air passage 9 is provided through the plunger to permit air to pass through the plunger as it is removed from the cavity. A screen or fabric liner may be used to prevent the film from being sucked into the openings.

Instead of forming a single package from a narrow roll of film, a number of cavities may be covered with film in a single operation and with the action of a single plunger or a plurality of plungers a number of packages may be formed simultaneously.

I claim:

In the method of packaging with a heat-stretchable and heat-sealable film by a process in which the heated film is stretched into a cavity by a plunger and held there by vacuum while the material to be packaged is placed in the stretched film, and in which the package is closed by twisting the stretched film with respect to unstretched film while in the mouth of the cavity, the improvement which comprises releasing the vacuum after the twisting is completed.

GEORGE M. BROWN.